US009869554B1

(12) United States Patent
Sternowski

(10) Patent No.: US 9,869,554 B1
(45) Date of Patent: Jan. 16, 2018

(54) METHOD FOR LOCATING A RADIATION SOURCE USING POWER MEASUREMENTS

(75) Inventor: Robert Sternowski, Cedar Rapids, IA (US)

(73) Assignee: SOFTRONICS, LTD., Marion, IA (US)

( * ) Notice: Subject to any disclaimer, the term of this patent is extended or adjusted under 35 U.S.C. 154(b) by 1070 days.

(21) Appl. No.: 13/533,296

(22) Filed: Jun. 26, 2012

Related U.S. Application Data

(63) Continuation-in-part of application No. 13/493,415, filed on Jun. 11, 2012, now abandoned.

(60) Provisional application No. 61/610,561, filed on Mar. 14, 2012.

(51) Int. Cl.
*G01C 21/00* (2006.01)

(52) U.S. Cl.
CPC .................................. *G01C 21/00* (2013.01)

(58) Field of Classification Search
CPC ....................................................... G01C 21/00
See application file for complete search history.

(56) References Cited

U.S. PATENT DOCUMENTS

| | | | |
|---|---|---|---|
| 5,614,912 A | 3/1997 | Mitchell | |
| 7,345,582 B2 | 3/2008 | Gould | |
| 7,550,738 B1 | 6/2009 | DeVito | |
| 7,817,092 B1 | 10/2010 | Olivieri et al. | |
| 8,004,459 B2 | 8/2011 | Ho et al. | |
| 8,525,725 B2 | 9/2013 | Libby et al. | |
| 8,862,067 B2 | 10/2014 | Un et al. | |
| 2005/0032531 A1 | 2/2005 | Gong et al. | |
| 2005/0080557 A1 | 4/2005 | Sirola | |
| 2009/0005061 A1 | 1/2009 | Ward et al. | |
| 2009/0201208 A1 | 8/2009 | McPherson et al. | |
| 2010/0194641 A1* | 8/2010 | Miller | G01S 5/04 342/417 |
| 2014/0134948 A1 | 5/2014 | Ghose | |

OTHER PUBLICATIONS

B.R. Jackson, S. Wang and R. Inkol, Emitter Geolocation Estimation Using Power Difference of Arrival—An Algorithm Comparison for Non-Cooperative Emitters, Defence Research and Development Canada, Technical Report, May 2011.
Sichun Wang and Robert Inkol, A Near-Optimal Least Squares Solution to Received Signal Strength Difference Based Geoloation, Defence Research and Development Canada, Crown, 2011.

(Continued)

*Primary Examiner* — Manuel Rivera Vargas
(74) *Attorney, Agent, or Firm* — Shuttleworth & Ingersoll, PLC; Jason Sytsma

(57) ABSTRACT

A system suitable for determining a location of an emitter emitting a radiation signal from an unknown location has a vehicle with a location position determining apparatus to receive a location datum, so the location of the vehicle can be determined when the radiation signal is received. A sensor connected to a receiver is positioned on the vehicle to detect and receive the radiation signal at a plurality of locations. A processor having a program executing therein determines the power level of the radiation signal at each measurement location and determines the location of the emitter from the change in power level of the radiation signal between measurement locations.

12 Claims, 12 Drawing Sheets

0 db (0%) measurement error injected

(56) References Cited

OTHER PUBLICATIONS

Brad R. Jackson, S. Wang and R. Inkol, Received Signal Strength Difference Emitter Geolocation Least Squares Algorithm Comparison, IEEE CCECE, Niagra Falls, Canada, May 2011.
Ding-Bing Lin and Rong-Terng Juang, Mobile Location Estimation Based on Differences of Signal Attenuations for GSM Systems, IEEE Transactions on Vehicular Techology, vol. 54, No. 4, Jul. 2005.
Robert Sternowski—U.S. Appl. No. 13/493,449, filed Jun. 11, 2012.

* cited by examiner

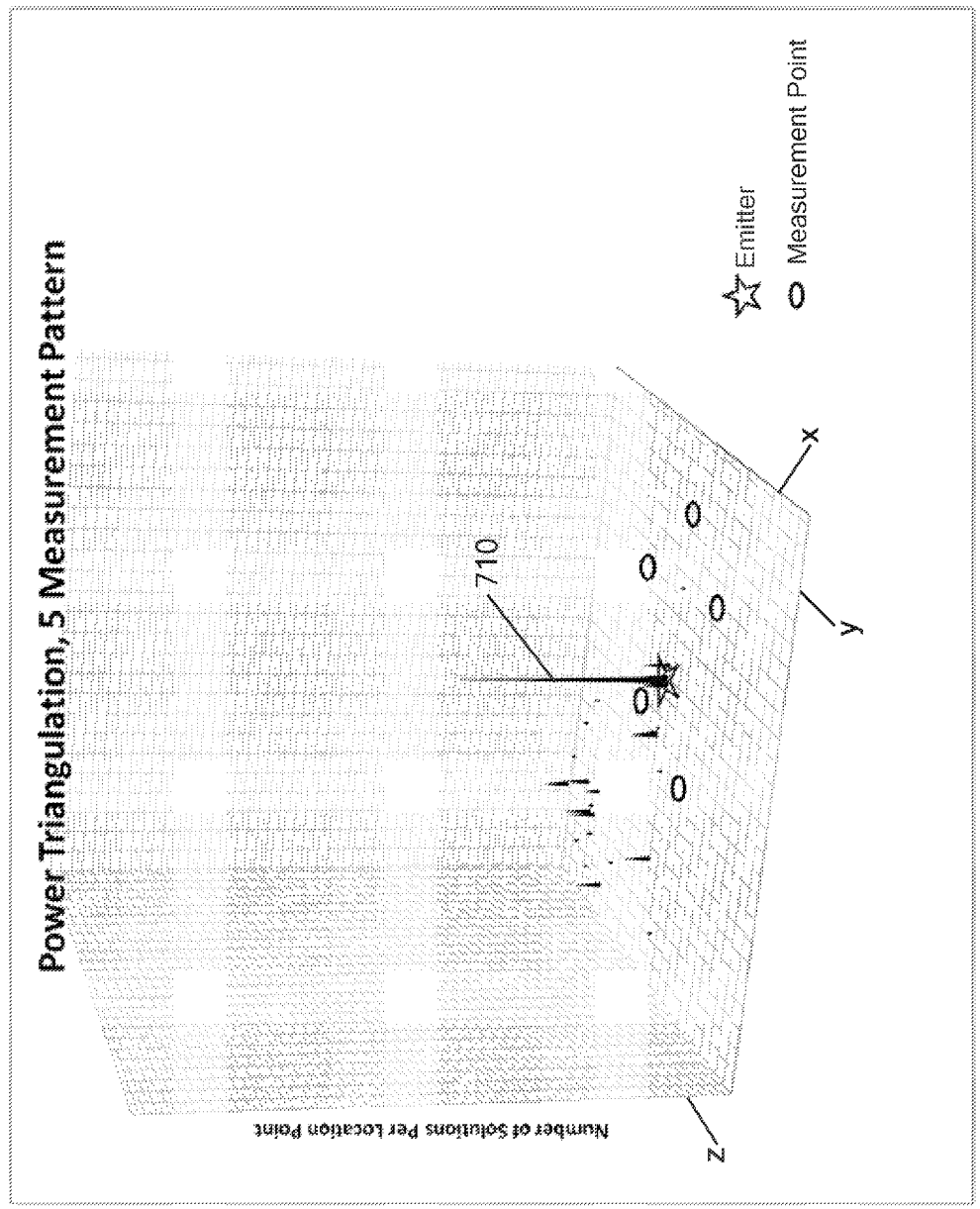

METHOD FOR LOCATING A RADIATION SOURCE USING POWER MEASUREMENTS

This application is a continuation-in-part and claims priority to U.S. application Ser. No. 13/493,415 filed Jun. 11, 2012, and to U.S. Provisional Application No. 61/610,561 filed Mar. 14, 2012, the entirety of both are incorporated by reference herein.

BACKGROUND

One of the gravest threats to the United States involves rogue nuclear warheads or "dirty bombs," which if detonated in a major population center could result in considerable loss of life and property. Governments and organizations have taken steps to prevent terrorists from smuggling dirty bombs into the country, such as securing radioactive sources within the country and securing the nations borders. Indeed, many improvements have been made to detect the presence of radioactive material, for example, detecting the presence of radio active material concealed within cargo containers. These advancements, however, rely on detecting the presence of radioactive material. In order for this to work, the appropriate detector must be within the vicinity of the radioactive material. It would be useful, however, to be able to detect radioactive material from multiple widely dispersed locations in order to geolocate the radioactive material without having to be in the immediate proximity of the radioactive material.

SUMMARY

According to the present invention, a system for determining a location of an emitter emitting a radiation signal is provided. The system includes a vehicle with a position determining device to report a location datum, so the location of the vehicle can be determined when the radiation signal is received. A sensor connected to a receiver is positioned on the vehicle to detect and receive the radiation signal at a plurality of locations. A processor having a program executing therein determines the power level of the radiation signal at each measurement location and determines the location of the emitter from the change in power level of the radiation signal between measurement locations. The system determines the location of the emitter by equating a ratio of the distances between the measurement points and the emitter with a ratio of a change in power level of the radiation signal between measurement points.

In another embodiment, a method for determining the location of the emitter is provided. The radiation signal is received at a plurality of measurement points, and the coordinates for each measurement point are determined. The power level of the radiation signal at each measurement point is also determined. The method calculates the location of the emitter by equating a ratio of the distances between the measurement points and the emitter with a ratio of a change in power level of the radiation signal between measurement points.

BRIEF DESCRIPTION OF THE DRAWINGS

FIG. 7C is a histogram of the intersection groupings for the location of the emitter with 0.5 dB random measurement error.

DETAILED DESCRIPTION OF THE ILLUSTRATED EMBODIMENTS

In general, a geolocation system according to an embodiment of the invention makes use of a sensor taking nuclear radiation power measurements in multiple locations. Neutron radiation and high energy gamma radiation travels through most media with a generally constant propagation loss exponent. This constant propagation loss property means that only a changing distance between the sensor and the emitter can account for a change in received power. From this assumption, the location of the emitter can be determined.

The minimum number of power measurements for determining an unambiguous location of the emitter is four; however, the location can be accurately predicted with as few as three power measurements. Two power measurements can yield a useful result showing the location for the emitter somewhere on a unique set of locus of points according to the power ratio between two measurement points. For the purpose of this disclosure an emitter can be any device emitting alpha, beta, gamma, and x radiation or neutron radiation, although alpha and beta radiation have low permeability, and therefore limited applicability.

Figure 1:
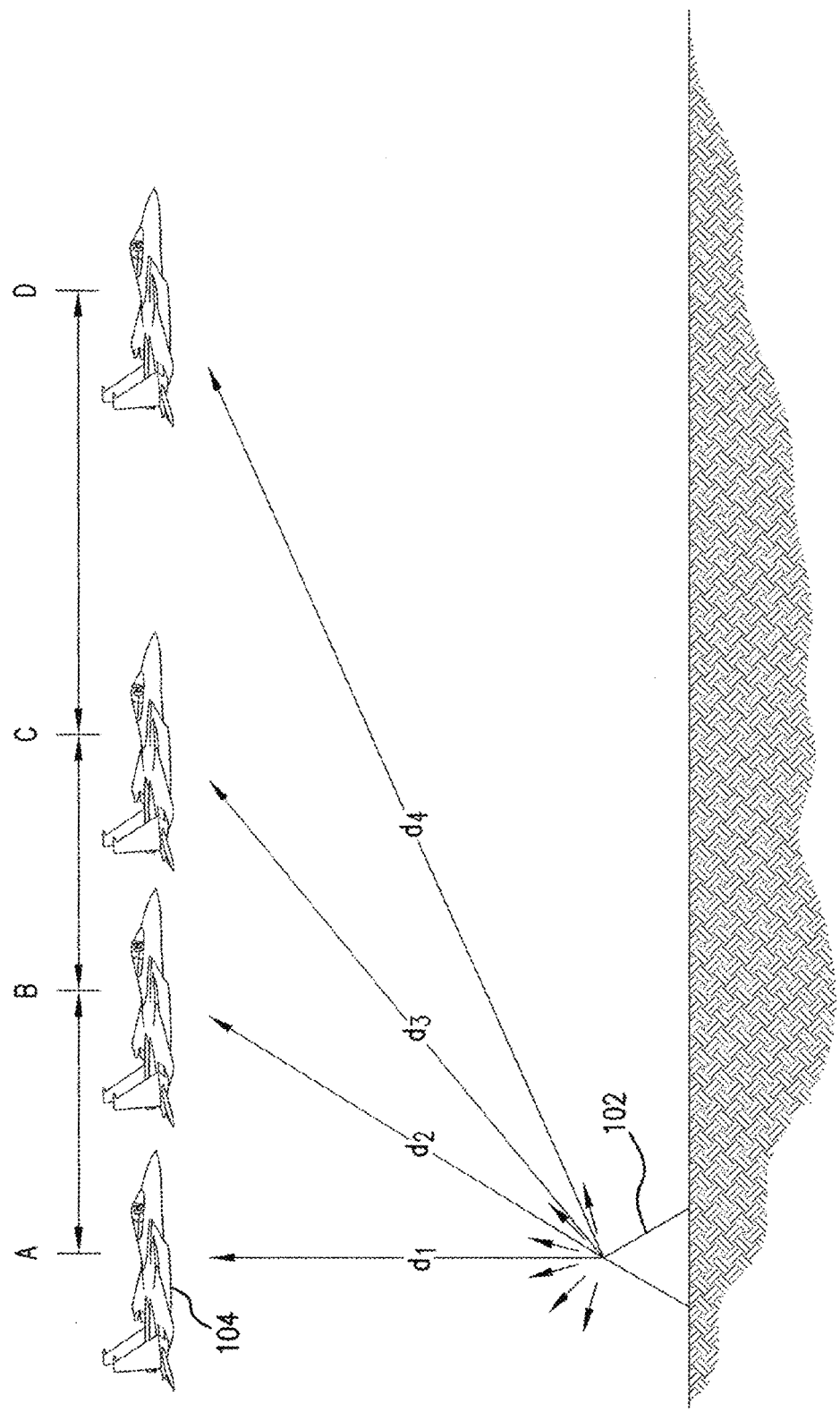
FIG. 1 illustrates the geolocation scenario where an emitter at an unknown location emits radiation signals that are received at four distinct locations by a sensor positioned on a vehicle.

FIG. 1 shows an emitter 102 emitting a radiation signal at a generally constant power level from an unknown location (x,y). Emitter 102 is assumed to be stationery or moving slowly with respect to vehicle 104. Vehicle 104 can be any apparatus, such as a land based vehicle, an air or space based vehicle, including, for example, an airplane, a helicopter, a satellite, an unmanned vehicle, or a balloon, or a sea-based vehicle, including, for example, a ship or a submarine, or a stationary vehicle such as a tower.

Figure 1A:
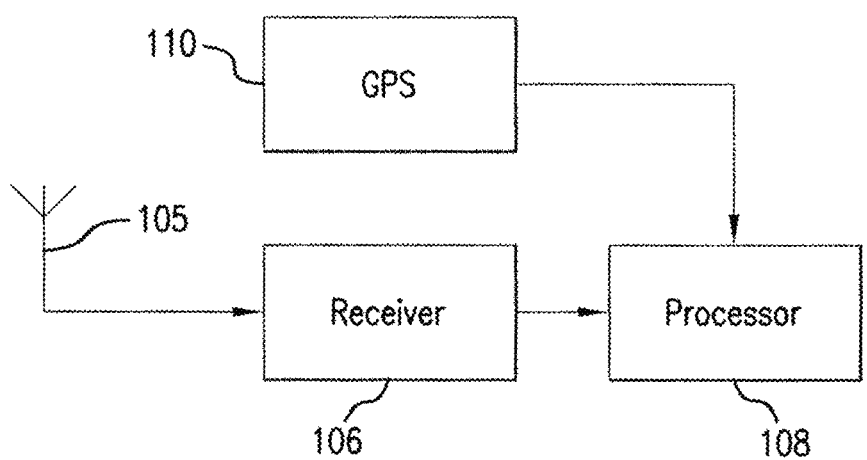
FIG. 1A is a schematic of a receiver system located in the vehicle of FIG. 1.

Vehicle 104 has sensor 105 electrically connected to a receiver 106, as shown in FIG. 1A. Receiver 106 periodically detects the radiation signal received from sensor 105 at multiple locations, and logs the location of each measurement. A processor 108 in communication with receiver 106 determines a power measurement for the radiation signal at each location and the change in power level of the signal between locations.

A position determining device 110 is connected to processor 108 to provide processor 108 with the location of vehicle 104 when the radiation signal is received. Position determining device 110 can include an internal navigation device, a GPS receiver, or any other type of device capable of determining the geolocation of vehicle 104 at a given time. Alternatively, multiple stationary vehicles 104 can be positioned with each vehicle's 104 coordinates logged and stored in a centralized processor 108.

Processor 108 calculates the location of emitter 102 by equating a ratio of the distances between the measurement points and the emitter with a ratio of a change in power level of the radiation signal between measurement points. This can be performed on a continuous basis, improving the accuracy by accumulating more measurements from more locations. Because only the propagation loss is responsible for the difference in signal power measurements between two points, the ratios must be equal. The path loss exponent of the radiation signal propagating in free space is proportional to $1/r^2$, where r is the distance from emitter 102 to sensor 105. The distance between the measurement points A,D is known from position determining device 110 that tracks the movement of vehicle 104.

Between any two measurement points, a set of possible solutions (a locus) for the location of emitter 102 can be determined from the following property: The ratio of the distances between any two measurement points (for example, A,D), and the unknown emitter 102 location must equal the ratio of the power between measurement points A,D. The solution can be defined as a circle that passes between the two measurements points and encircles the stronger of the two measurement points. The circle has a radius inversely proportional to the difference in signal strength, i.e. the diameter of the circle is related to the power ratio. The location for the emitter must lie somewhere on the circumference of the circle.

The distance $(d_{AB})$ between two measurement points A $(x_A, y_B)$, B $(x_B, y_B)$ is found by the following:

$$d_{AB} \sqrt{(x_A-x_B)^2+(y_A-y_B)^2}$$

The ratio of the change in power level (K), where K is measured in decibels, of the radiation signal between the two measurement points A, B is defined by the following equation, where $\alpha$ equals the path loss exponent ($\alpha$), which equals 2, and $P_A-P_B$ is the difference in power level between the two measurement points A, B:

$$10^{\frac{P_A-P_B}{10\alpha}} = K$$

As stated above, the solution can be defined as a circle that passes between measurements points A $(x_A, y_B)$, B $(x_B, y_B)$ and encircles the stronger of the two measurement points, with a radius inversely proportional to the difference in signal strength. The center of the circle is translated and normalized into the x,y coordinate system by recognizing that the center of the circle lies on the straight line between measurement points A $(x_A, y_B)$, B $(x_B, y_B)$ that is offset from the x-axis by an angle, $\theta$. The diameter of the circle and $\theta$ are defined as follows:

$$\text{Diameter} = \left(\frac{d_{AB}}{(K-1)} - \frac{d_{AB}}{K+1}\right)$$

$$\Theta = \text{ATAN}\left(\frac{y_A - y_B}{x_A - x_B}\right)$$

The center of the circle is offset from the stronger of the two measurement points by some value that is a function of the difference in power between the two measurement points and the distance between the two measurement points. Using the above equations, a solution set for the locus for the unknown emitter is defined as follows:

$$\begin{bmatrix} y_{center} = y_A + \text{Diameter} * \sin\Theta; & \text{if}(y_A > y_B) \\ y_{center} = y_A - \text{Diameter} * \sin\Theta; & \text{if}(y_B > y_A) \\ x_{center} = x_A + \text{Diameter} * \sin\Theta; & \text{if}(x_A > x_B) \\ x_{center} = x_A - \text{Diameter} * \sin\Theta; & \text{if}(x_B > x_A) \end{bmatrix}$$

The geolocation of emitter 102 lies somewhere on the locus of points defined by the circle. As previously stated, the solution set can be narrowed with more measurements, with each new measurement point producing new set of circle equations. It stands to reason that if the location of emitter 102 lies somewhere on the locus of points defined by each circle, then, between multiple circles, emitter 102 must lie on one of the intersection points of the circles. The intersection points for all of the measurement-pair loci can be solved as a set of simultaneous equations, which solutions are represented graphically in FIGS. 2-6.

Figure 2:
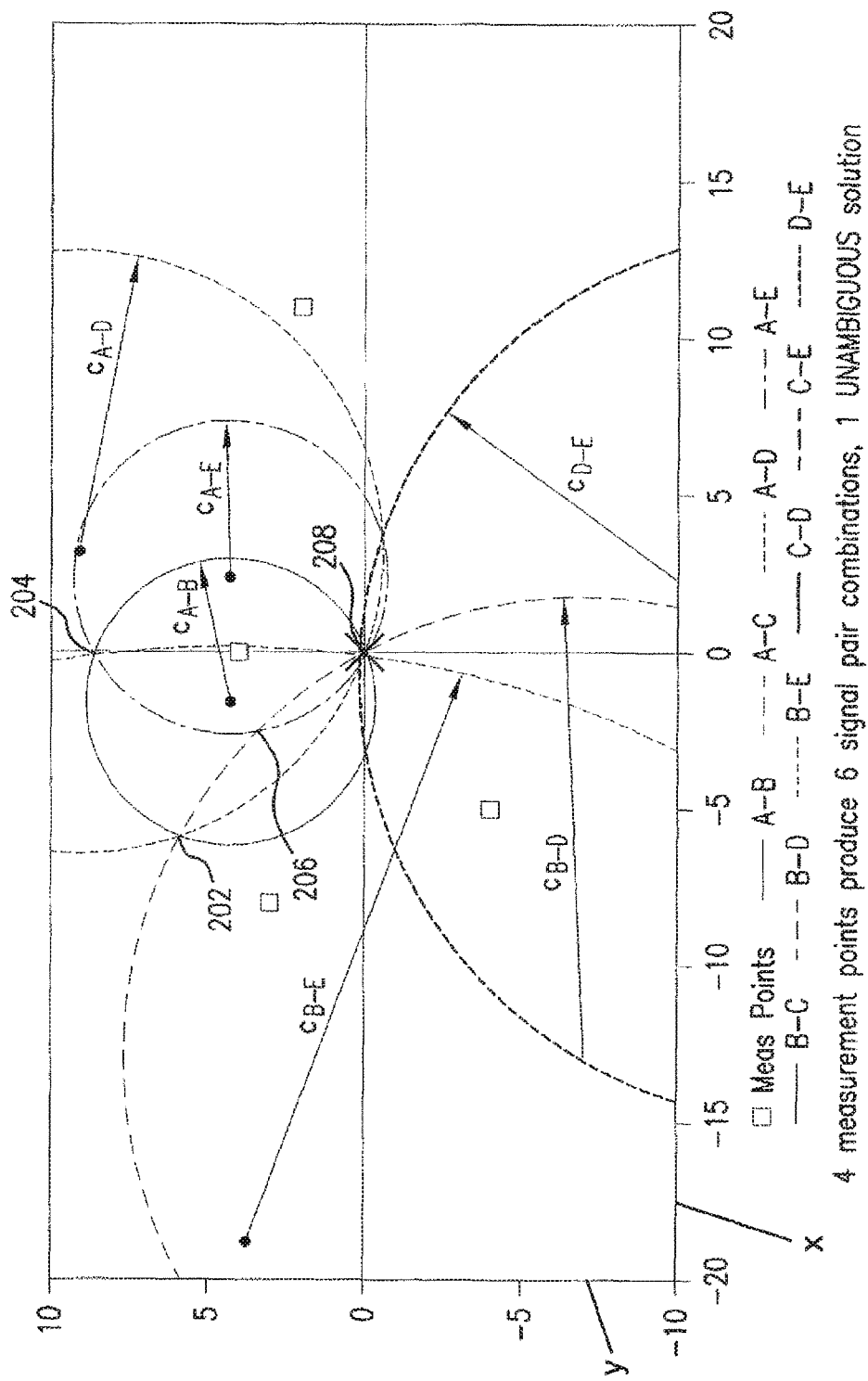
FIG. 2 is a graphical solution of the location of the emitter determined from four measurement points.

FIG. 2 shows a graphical solution for the location of emitter 102. Each of the six circles (A-B, A-D, A-E, B-D, B-E, and D-E) can intersect with another circle a maximum of two times. Consequently, there are up to eight intersections derived from four measurements. While many intersections of loci can be observed, for example, at points 202, 204, and 206, there is only one point 208 where all the loci intersect. The intersection of these six circles can be found in any conventional manner, for example, graphically by plotting the solutions, or mathematically by solving a set of simultaneous equations.

Figure 3:
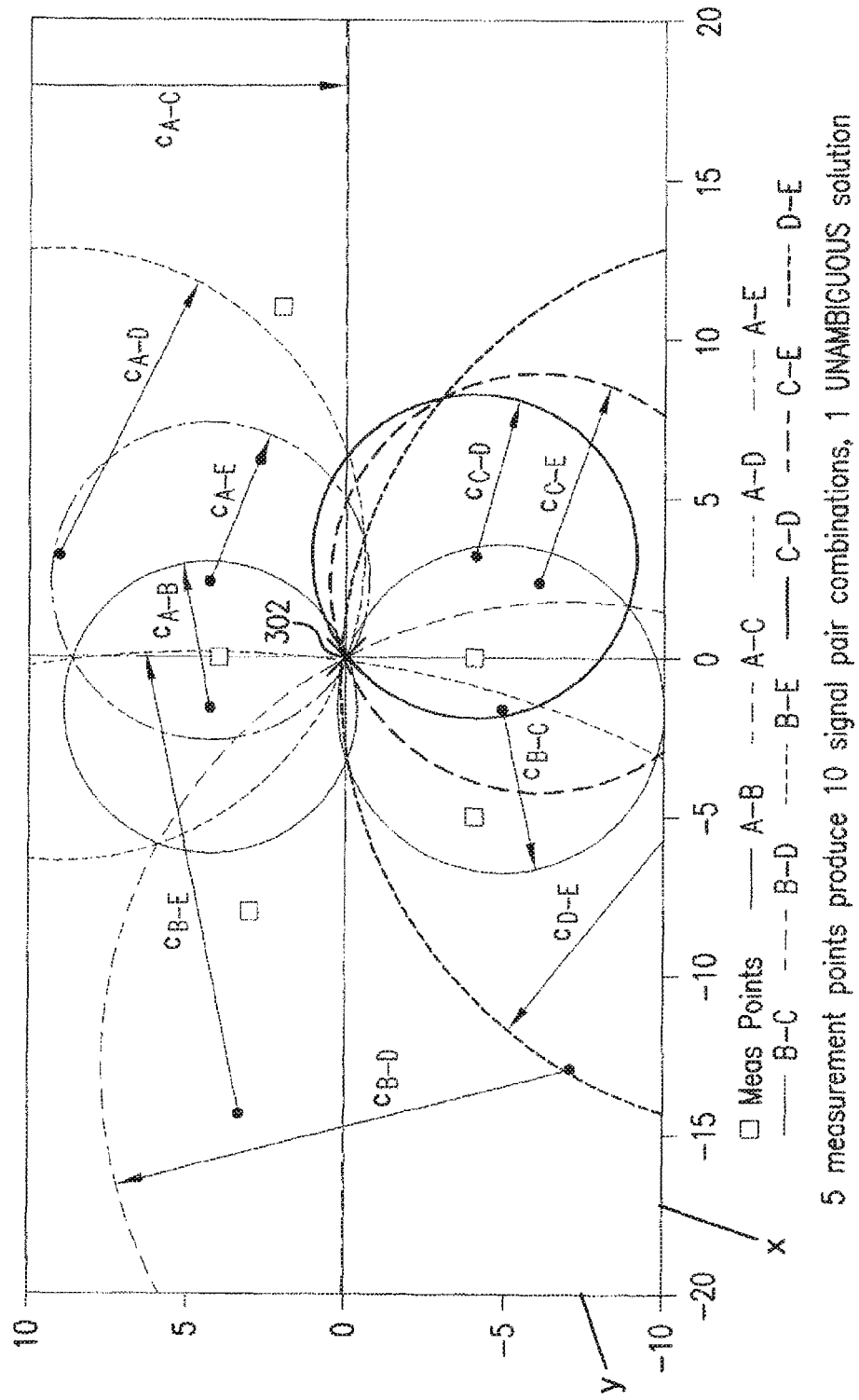
FIG. 3 is a graphical solution of the location of the emitter determined from five measurement points.

FIG. 3 shows a graphical solution where signal power measurements are taken at five distinct locations, A, B, C, D, E. The graphical solution produces ten signal pair combinations, and thus ten circles (A-B, A-C, A,D, A-E, B-C, B-D, B-E, C-D, C-E, and D-E), with a single unambiguous solution at point 302 for the position of emitter 102. Increasing the number of measurement points continues to yield a single unambiguous solution for the location of emitter 102, but with improved accuracy.

In situations with only three measurement points, the unknown location of emitter 102 can be accurately predicted in many situations from the number of intersections. Each intersection is a possible solution and often multiple intersections will lie on or near the same location. By grouping all the like intersections together and summing the number of like intersection, the largest grouping of intersections is the likely location for emitter 102.

Figure 4:
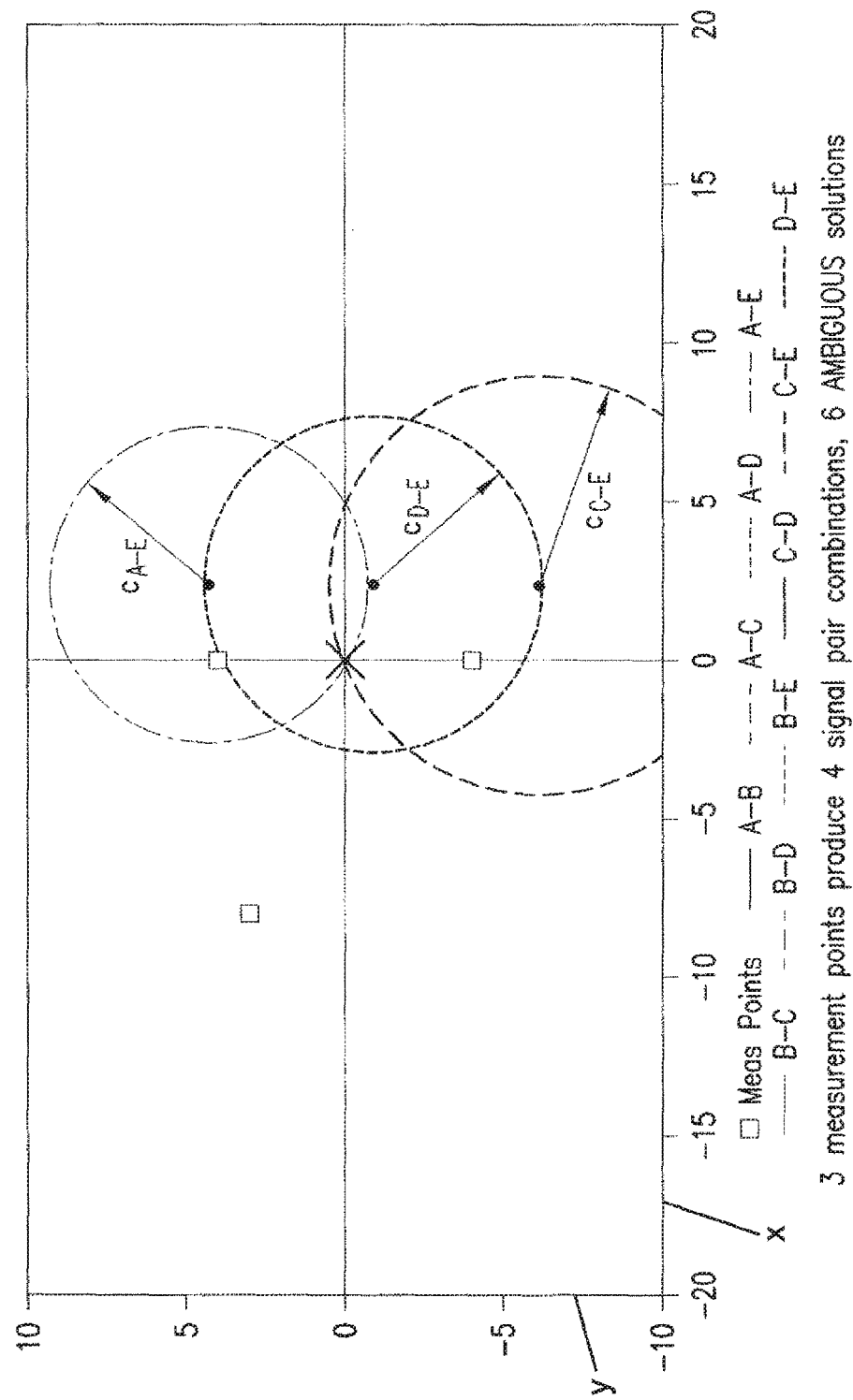
FIG. 4 is a graph illustrating several possible locations for the emitter provided by measurements from three points taken on a straight line path.

In some situations, the location of emitter 102 can not be estimated from three measurement points. For example, FIG. 4 shows a graph of signal power measurements taken at three distinct locations. The graphical solution produces four signal pair combinations with three circles and six ambiguous solutions. The centers for each of the three circles lie on a straight line. Therefore, the emitter is equally likely to be located at any of the six solutions. This situation is indicative of a sensor moving toward or away from emitter 102 in a straight line. Because, the sensor is on a moving vehicle 104, it is exceedingly unlikely to move in a perfectly straight line, which makes this solution an aberration. The more vehicle 104 deviates from a straight path, the more accurately the location of emitter 102 can be determined.

Figure 5:
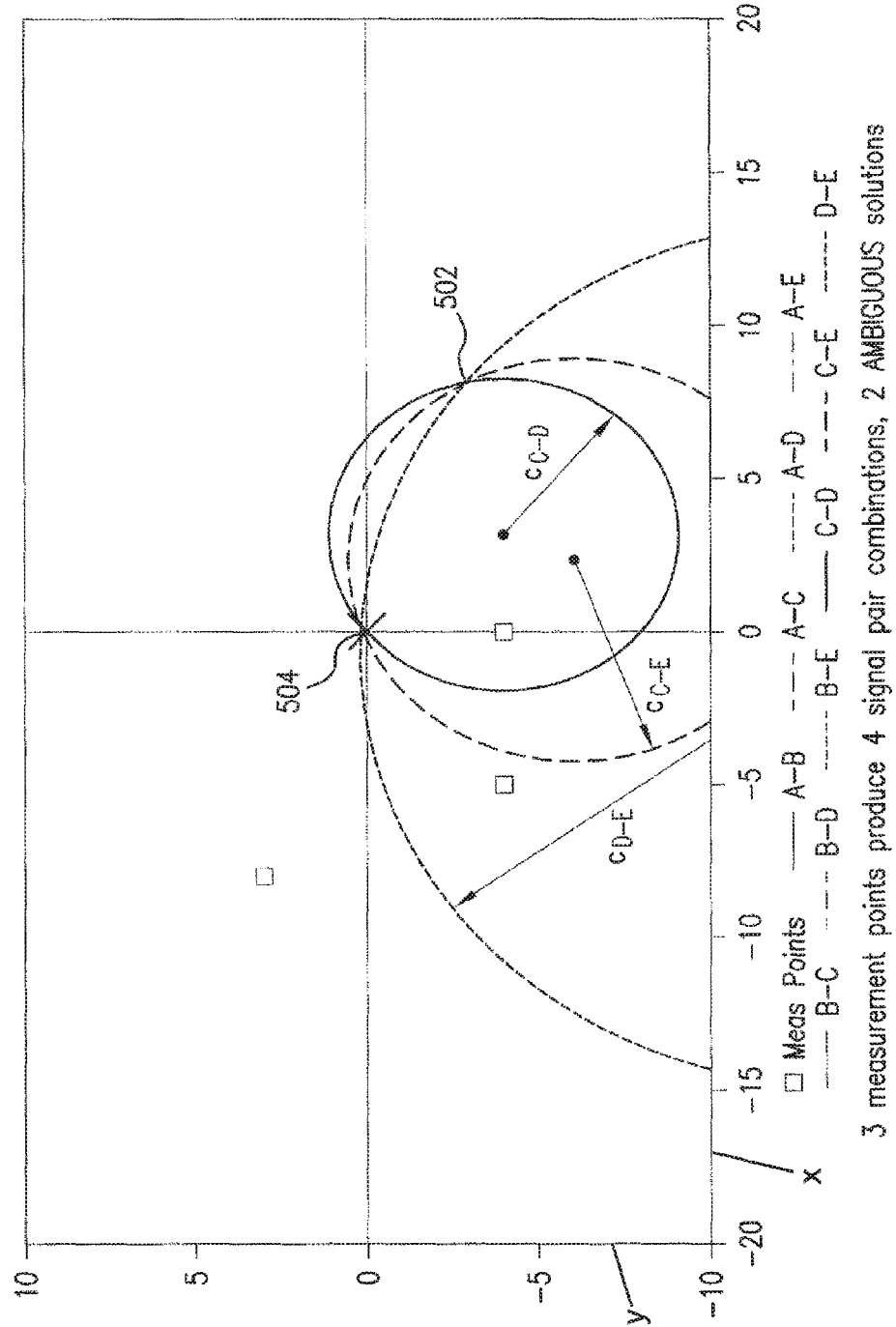
FIG. 5 is a graph illustrating several possible locations for the emitter provided by measurements from three points, two of which are taken on a straight line path.

FIG. 5 shows a graphical solution where signal power measurements are taken at three distinct locations, C, D, and E, but with one of the measurement locations deviated from the straight line. Even one deviation greatly improves the predictability of the system reducing the number of possible ambiguous solutions to two, 502 and 504.

Figure 6:
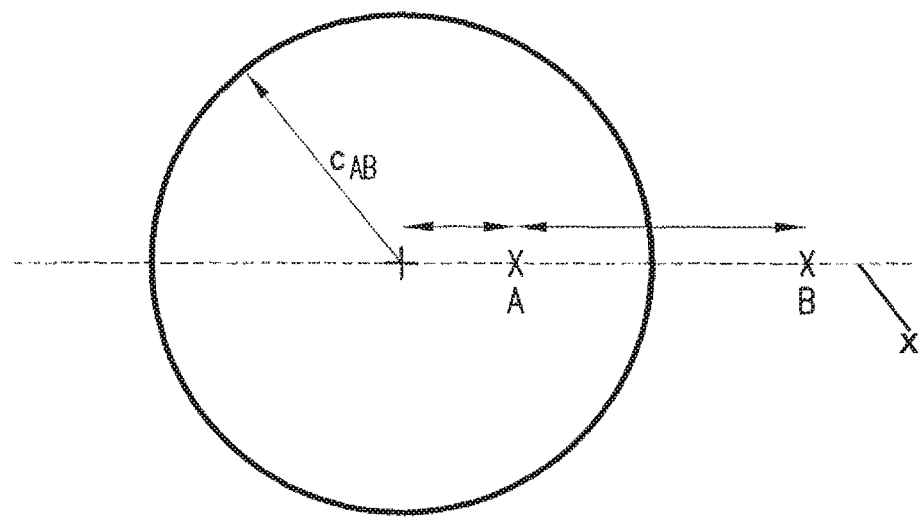
FIG. 6 is a graph illustrating an infinite number of possible locations for the emitter provided by measurements from two points.

FIG. 6 shows an ambiguous graphical solution where signal power measurements are taken at two distinct locations, A and B. The graph shows one signal pair combination with one circle and an infinite number of possible solutions. Because the emitter is equally likely to be at any of the infinite number of possible locations, it is impossible to pinpoint the location of emitter 102 with two or fewer measurement points. However, this precise locus can still provide useful emitter 102 location information, because portions of the locus can often be eliminated by other knowledge of terrain, geographic features, or a priori knowledge of the emitter behavior and/or probable location.

Noise and deviations from the constant path loss exponent can lead to measurement errors, which results in circles that do not all intersect at a single point. The correct location can be estimated by grouping all of the like intersection points together and summing the total number of intersections in each grouping, and then plotting the distribution of like solutions in a histogram. FIGS. 7A-7E show histograms of the intersection groupings with an increasing amount of random measurement error. The amount of measurement error is represented in decibels (dB), where 1 dB is approximately 20% random measurement error and 2 dB is approximately 40% random measurement error.

Figure 7A:
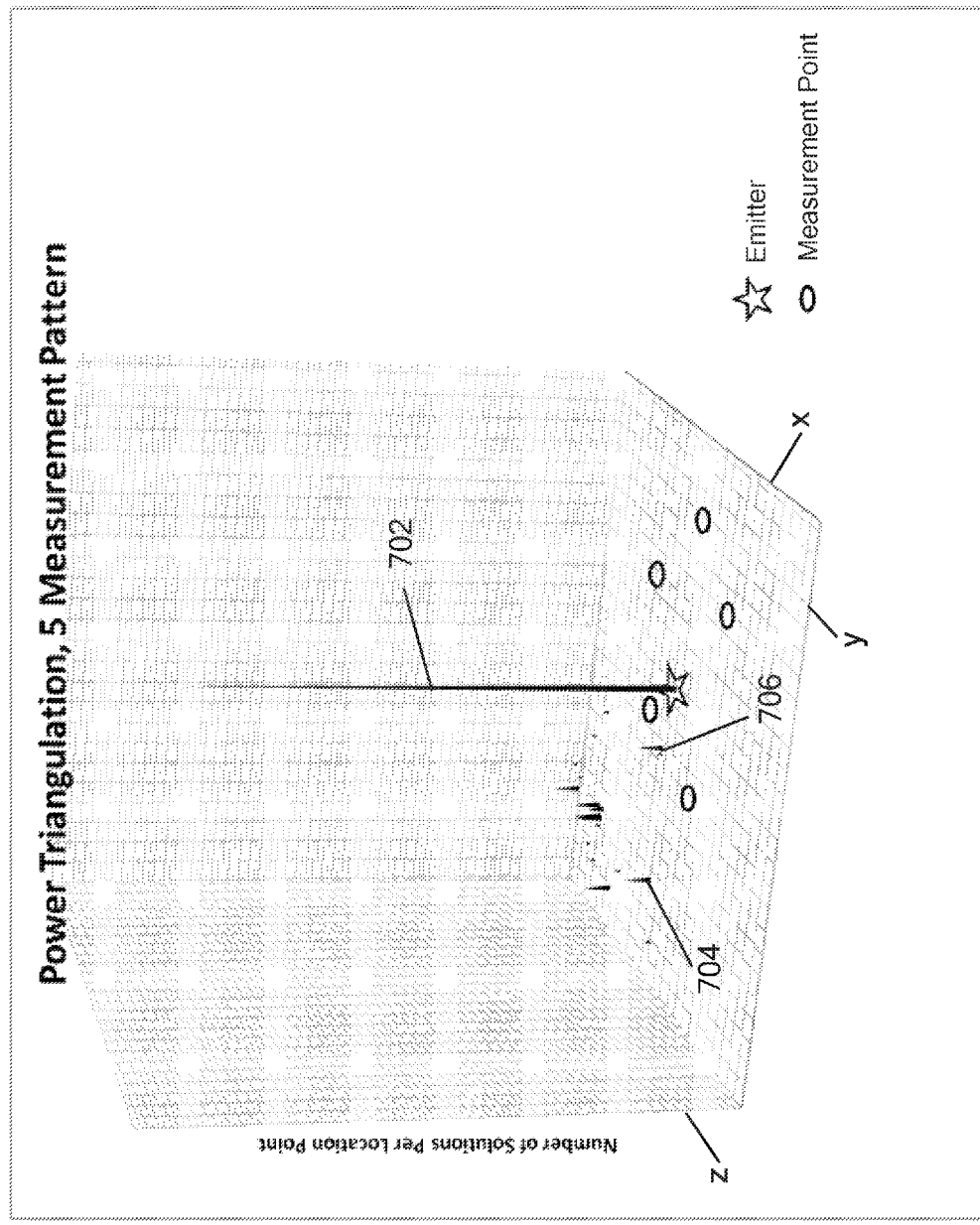
FIG. 7A is a histogram of the intersection groupings for the location of the emitter with 0 dB random measurement error.

FIG. 7A demonstrates the accuracy of the location estimate with 0 dB random measurement error, i.e. a basis model. FIGS. 7B-7E represent the location estimate with an increasing amount of measurement error. FIGS. 7B-7E are derived by increasing the proportion of a fixed random error data set that is injected into the basis model, shown in FIG. 7A. This keeps the ratio of the error injected among measurement points constant, but not the error itself. In the field, random measurement error cannot be controlled in such a precise manner, however, keeping the ratio of the injected error constant is useful to show the slowly creeping effects of increasing error.

FIG. 7A demonstrates the accuracy of the location estimate with 0 dB random measurement error. By far, the greatest number of solutions lies at location 702, which means it has the highest probability with respect to location 702 of being the correct location of emitter 102. Several incorrect solutions are identified, e.g. at points 704 and 706; however, these solutions have a low probability as compared to location 702 of being correct.

Figure 7B:
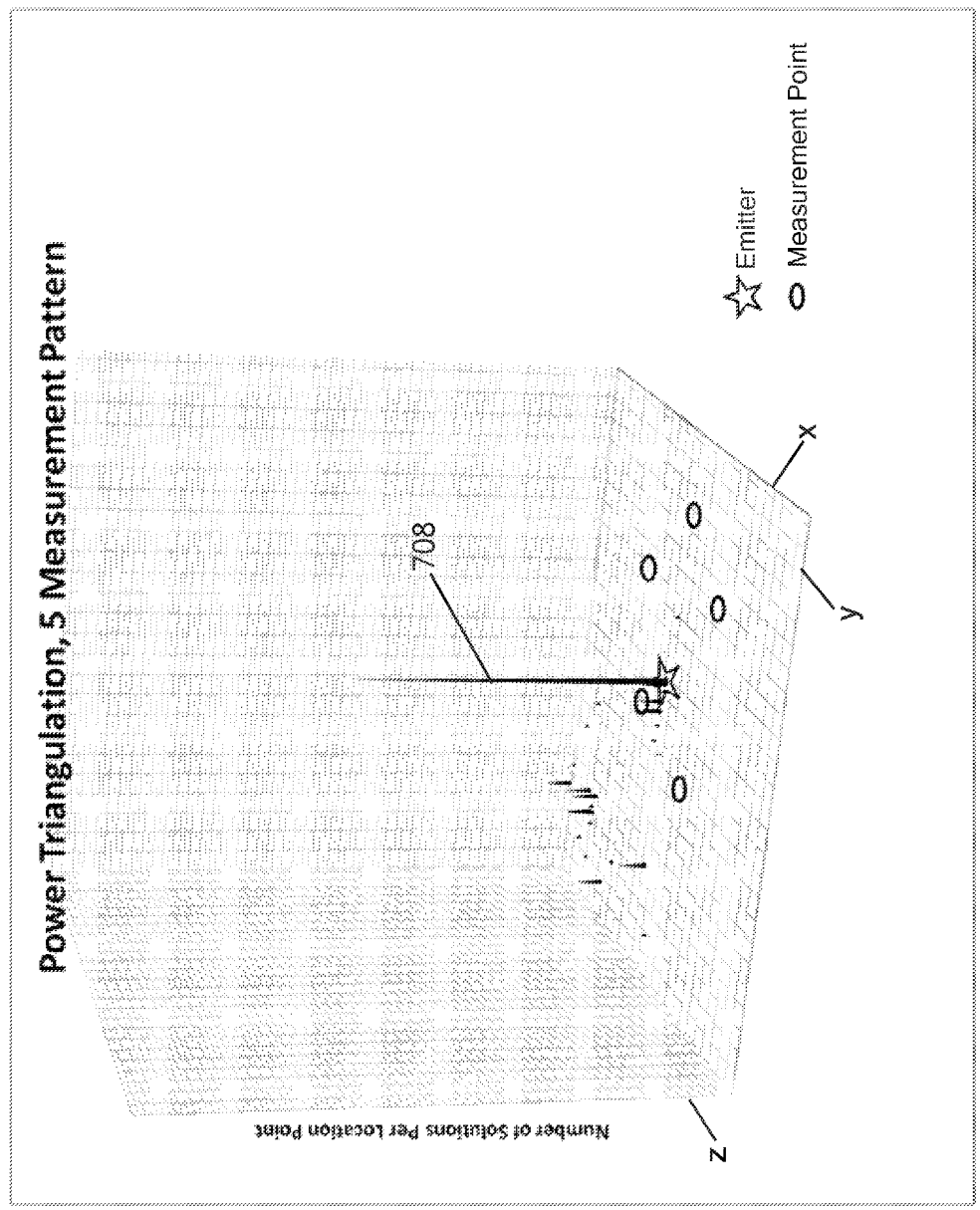
FIG. 7B is a histogram of the intersection groupings for the location of the emitter with 0.2 dB random measurement error.
Figure 7D:
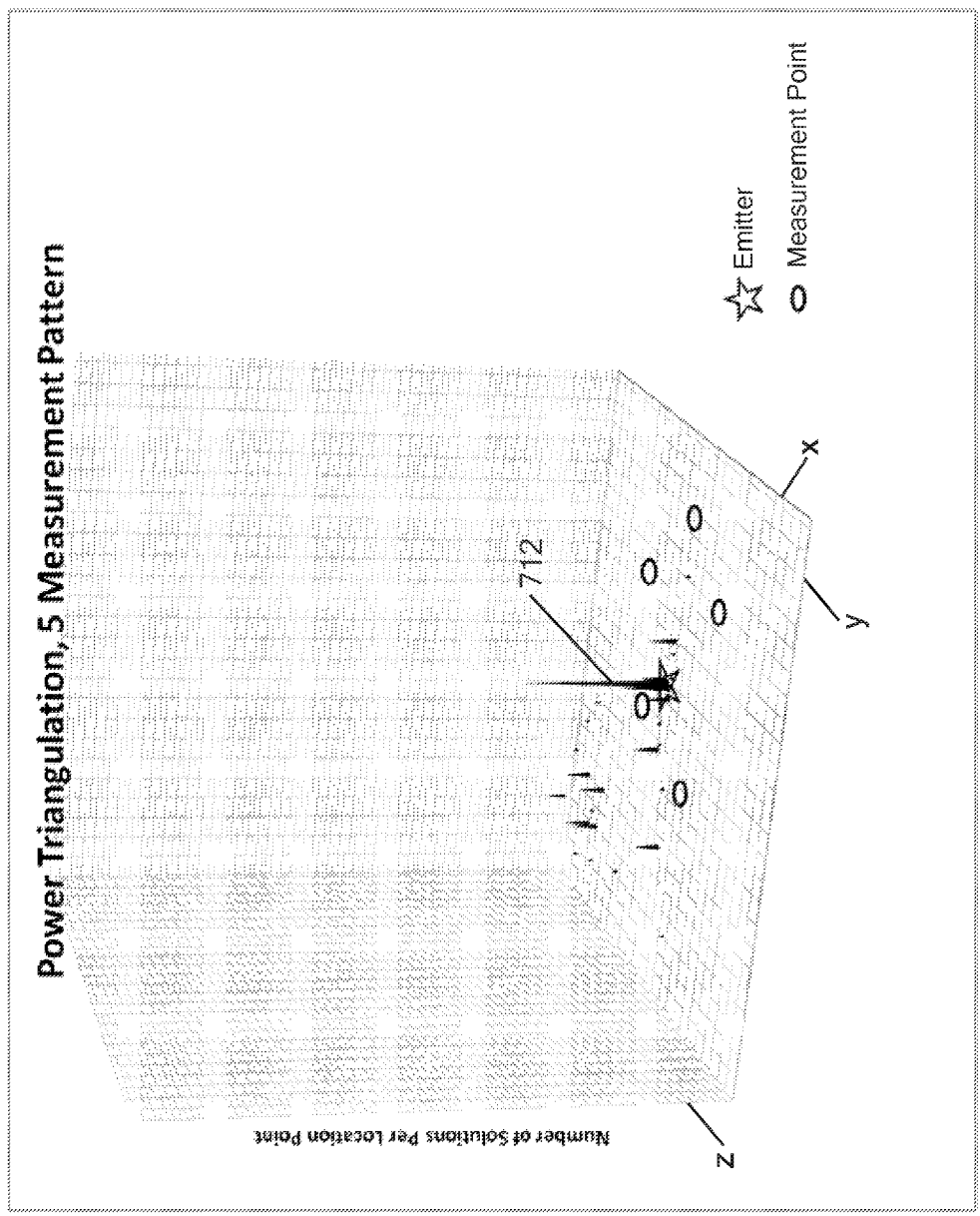
FIG. 7D is a histogram of the intersection groupings for the location of the emitter with 1.0 dB random measurement error.
Figure 7E:
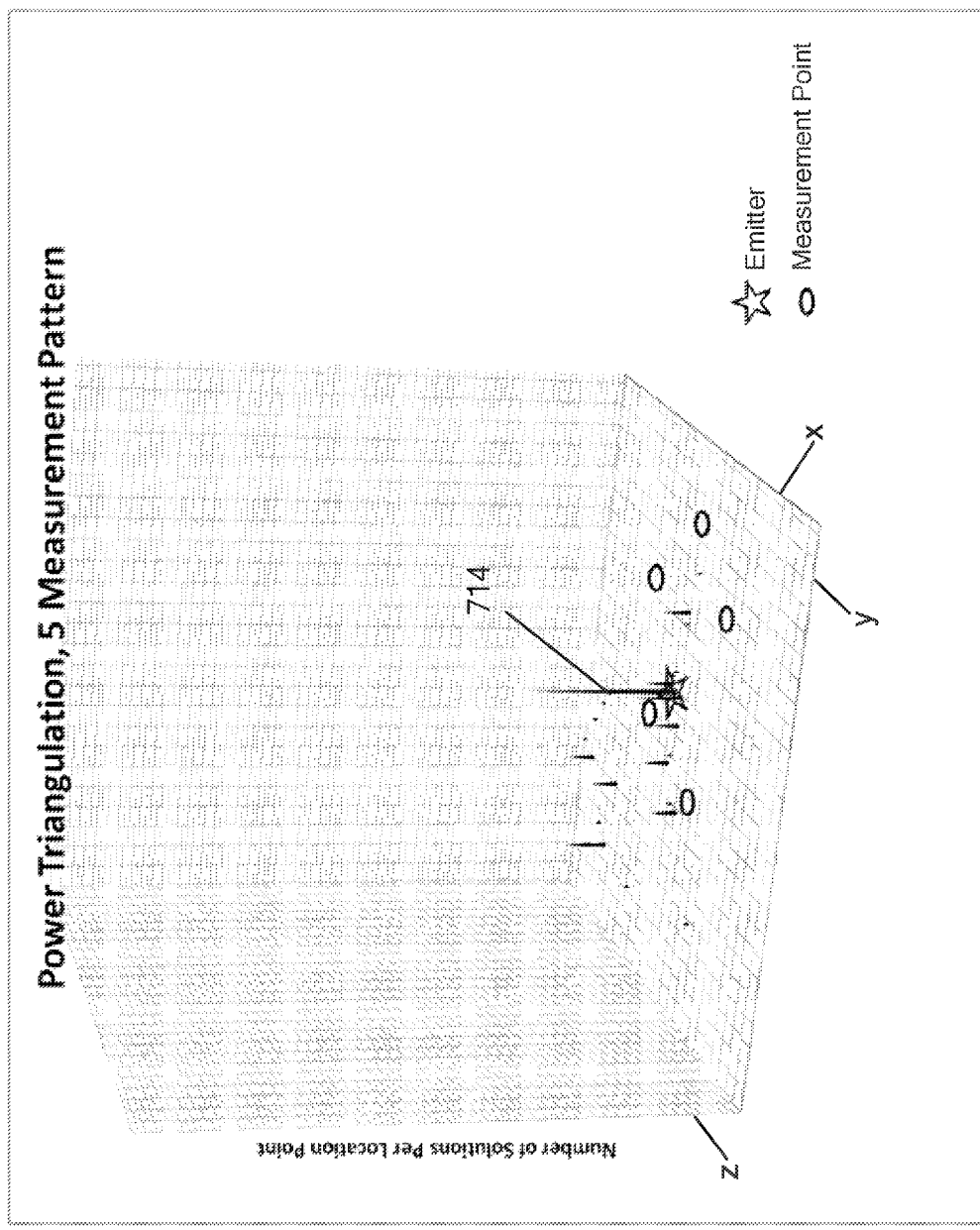
FIG. 7E is a histogram of the intersection groupings for the location of the emitter with 2.0 dB random measurement error.

FIGS. 7B-7D demonstrate the accuracy of the location with increasing amount of random measurement error. FIG. 7B shows a histogram of the intersecting groupings with a 0.2 dB random measurement error. FIG. 7C shows a histogram of the intersecting groupings with a 0.5 dB random measurement error. FIG. 7D shows a histogram of the intersecting groupings with a 1.0 dB random measurement error. FIG. 7E shows a histogram of the intersecting groupings with a 2.0 dB random measurement error. In each histogram, the number of solutions at the correct location 708, 710, 712, and 714, FIGS. 7B, 7C, 7D, and 7E respectively, decreases; however, the "correct" location has substantially more solutions than the other locations. In that regard, the solution with the highest number of intersecting groupings is most likely the correct solution.

The intersection grouping method, as discussed above, may not yield a clear majority for the number of solutions at a particular location when there is a large amount of random measurement error. The large amount of random measurement error notwithstanding, an accurate location for emitter 102 can be predicted using a data smoothing function. There are many types of data smoothing functions known to those skilled in the art, any one of which can be employed. The illustrative embodiment uses a moving symmetric window. Generally, the moving windowing scheme takes a window of data around a given data point and replaces it with a sum of all of the intersections within the window. The window is moved across all of the data until all or almost all of the data in the data set has been evaluated. The window location with the highest sum is the probable location of emitter 102.

The method as described above is applied in a two-dimensional scenario with receiver 106, sensor 105, and position determining device 110 mounted on vehicle 104. Vehicle 104 is flown in a random search pattern with the power levels of the radiation signal recorded and retrieved from vehicle 104 when it returns to base or transmitted to the base station by a data link from vehicle 104, or the location results can be computed onboard and retrieved or transmitted via downlink to a base station. While a two-dimensional approach is used, in reality it is a three-dimensional problem. This methodology, with an additional application of trigonometry, can be applied to the three-dimensional case as well. Vehicle 104 is positioned at a finite altitude measuring emitter 102 most likely from the ground, i.e. zero altitude. If the altitude is small compared to the distance to the potential target emitters (typically >=5-10:1) then the two-dimensional analysis is a reasonable approximation to a more complex three-dimensional analysis.

Reference has been made to a specific mathematical method for determining the location of the unknown emitter. One skilled in the art will also readily recognize that other mathematical solutions are also contemplated. For example, where signal power measurements are taken at four distinct measurement points A, B, C, D with emitter 102 emitting a radiation signal at a generally constant power level from an unknown location at a point (x, y), the distance from each measurement point A, B, C, D to the emitter is given by:

$$d_1 = \sqrt{(x-x_1)^2 + (y-y_1)^2}$$

$$d_2 = \sqrt{(x-x_2)^2 + (y-y_2)^2}$$

$$d_3 = \sqrt{(x-x_3)^2 + (y-y_3)^2}$$

$$d_4 = \sqrt{(x-x_4)^2 + (y-y_4)^2}$$

The difference in signal power between the measurement points is related to the constant path loss ($\alpha$), which equals 2, and the ratio of distances between measurement points and the emitter.

$$P_{12} = P_1 - P_2 = -10\alpha \log_{10}\left(\frac{d_1}{d_2}\right)$$

$$P_{23} = P_2 - P_3 = -10\alpha \log_{10}\left(\frac{d_2}{d_3}\right)$$

-continued $$P_{31} = P_3 - P_1 = -10\alpha\log_{10}\left(\frac{d_3}{d_1}\right)$$

$$P_{14} = P_1 - P_4 = -10\alpha\log_{10}\left(\frac{d_1}{d_4}\right)$$

$$P_{24} = P_2 - P_4 = -10\alpha\log_{10}\left(\frac{d_2}{d_4}\right)$$

$$P_{34} = P_3 - P_4 = -10\alpha\log_{10}\left(\frac{d_3}{d_4}\right)$$

The distance ratios derived from the above equations, are as follows:

$$d_{12} = \left(\frac{d_1}{d_2}\right) = 10^{-\frac{P_1-P_2}{10\alpha}}$$

$$d_{23} = \left(\frac{d_2}{d_3}\right) = 10^{-\frac{P_2-P_3}{10\alpha}}$$

$$d_{31} = \left(\frac{d_3}{d_1}\right) = 10^{-\frac{P_3-P_1}{10\alpha}}$$

$$d_{14} = \left(\frac{d_1}{d_4}\right) = 10^{-\frac{P_1-P_4}{10\alpha}}$$

$$d_{24} = \left(\frac{d_2}{d_4}\right) = 10^{-\frac{P_2-P_4}{10\alpha}}$$

$$d_{34} = \left(\frac{d_3}{d_4}\right) = 10^{-\frac{P_3-P_4}{10\alpha}}$$

Four measurement points A, B, D, E produce six circle equations, each of which has a center point and a radius:

$$c_{12} = \left(\frac{x_C d_{12}^2 - x_1}{d_{12}^2 - 1}\right), \left(\frac{y_2 d_{12}^2 - y_A}{d_{12}^2 - 1}\right);$$

$$r_{12} = \sqrt{\left(\frac{x_1 - x_2 d_{12}^2}{d_{12}^2 - 1}\right)^2 + \left(\frac{y_1 - y_2 d_{12}^2}{d_{12}^2 - 1}\right)^2 - \frac{d_{12}^2 x_2^2 + d_{12}^2 y_2^2 - x_1^2 - y_1^2}{d_{12}^2 - 1}}$$

$$c_{23} = \left(\frac{x_2 d_{23}^2 - x_2}{d_{23}^2 - 1}\right), \left(\frac{y_3 d_{23}^2 - y_2}{d_{23}^2 - 1}\right);$$

$$r_{23} = \sqrt{\left(\frac{x_2 - x_3 d_{23}^2}{d_{23}^2 - 1}\right)^2 + \left(\frac{y_2 - y_3 d_{23}^2}{d_{23}^2 - 1}\right)^2 - \frac{d_{23}^2 x_3^2 + d_{23}^2 y_3^2 - x_2^2 - y_2^2}{d_{23}^2 - 1}}$$

$$c_{31} = \left(\frac{x_1 d_{31}^2 - x_3}{d_{31}^2 - 1}\right), \left(\frac{y_1 d_{31}^2 - y_3}{d_{31}^2 - 1}\right);$$

$$r_{31} = \sqrt{\left(\frac{x_3 - x_1 d_{31}^2}{d_{31}^2 - 1}\right)^2 + \left(\frac{y_3 - y_1 d_{31}^2}{d_{31}^2 - 1}\right)^2 - \frac{d_{31}^2 x_1^2 + d_{31}^2 y_1^2 - x_3^2 - y_3^2}{d_{31}^2 - 1}}$$

$$c_{41} = \left(\frac{x_4 d_{14}^2 - x_1}{d_{14}^2 - 1}\right), \left(\frac{y_4 d_{14}^2 - y_1}{d_{14}^2 - 1}\right);$$

$$r_{14} = \sqrt{\left(\frac{x_1 - x_4 d_{14}^2}{d_{14}^2 - 1}\right)^2 + \left(\frac{y_1 - y_4 d_{14}^2}{d_{14}^2 - 1}\right)^2 - \frac{d_{14}^2 x_4^2 + d_{14}^2 y_4^2 - x_1^2 - y_1^2}{d_{14}^2 - 1}}$$

$$c_{24} = \left(\frac{x_4 d_{24}^2 - x_2}{d_{24}^2 - 1}\right), \left(\frac{y_4 d_{24}^2 - y_2}{d_{24}^2 - 1}\right);$$

$$r_{24} = \sqrt{\left(\frac{x_2 - x_4 d_{24}^2}{d_{24}^2 - 1}\right)^2 + \left(\frac{y_2 - y_4 d_{24}^2}{d_{24}^2 - 1}\right)^2 - \frac{d_{24}^2 x_4^2 + d_{24}^2 y_4^2 - x_2^2 - y_2^2}{d_{24}^2 - 1}}$$

-continued $$c_{34} = \left(\frac{x_4 d_{34}^2 - x_3}{d_{34}^2 - 1}\right), \left(\frac{y_4 d_{34}^2 - y_3}{d_{34}^2 - 1}\right);$$

$$r_{34} = \sqrt{\left(\frac{x_3 - x_4 d_{34}^2}{d_{34}^2 - 1}\right)^2 + \left(\frac{y_3 - y_4 d_{34}^2}{d_{34}^2 - 1}\right)^2 - \frac{d_{34}^2 x_4^2 + d_{34}^2 y_4^2 - x_3^2 - y_3^2}{d_{34}^2 - 1}}$$

The intersection points for all of the measurement-pair loci can be solved as a set of simultaneous equations or represented graphically.

Reference has been made to several components throughout this disclosure as though each component is a unique component. One skilled in the art will readily recognize, however, that the various systems, receivers, and processors can be incorporated into one or more other systems, receivers, and processors thereby reducing the number of components.

Reference may also have been made throughout this disclosure to "one embodiment," "an embodiment," or "embodiments" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

While the present invention has been particularly shown and described with reference to exemplary embodiments thereof, it should be understood by those of ordinary skill in the art that various changes, substitutions and alterations could be made herein without departing from the spirit and scope of the invention as embodied by the appended claims and their equivalents.

What is claimed is:

1. A system for determining a probable location of an emitter emitting a radiation signal, the system comprising:
    a moving reference frame for taking measurements at a plurality of distinct, separate, and random measurement points with respect to the emitter that is effectively stationary with respect to a speed of the moving reference frame,
    a GPS receiver mounted on the moving reference frame for obtaining a location datum for the moving reference frame at each of the plurality of measurement points,
    a power measurement sensor mounted on the moving reference frame to detect a power measurement for a radiation signal at each of the plurality of measurement points with respect to the emitter,
    a display for graphically presenting the probable location of the emitter,
    a processor configured to associate the location datum from the GPS receiver at each of the plurality of measurement points with the power measurement for the radiation signal obtained from the power measurement sensor, and
    the processor connected to the power measurement sensor and programmed to calculate a power level of the radiation signal at the plurality of measurement points and to calculate a solution for the probable location of the emitter from a change in power level of the radiation signal between every pair of measurement points, and calculate the probable location of the emitter according to a location point for the probable location of the emitter having a greatest number of solutions, and transmit a graphical representation for the probable location of emitter to the display for graphically presenting the probable location of the emitter.

2. The system of claim 1, wherein the processor is programmed to calculate the location of the emitter by equating a ratio of the distances between each measurement point and the emitter with a ratio of a change in power level of the radiation signal between each measurement point.

3. The system of claim 2, wherein the processor is programmed to calculate a solution for the location of the emitter by calculating a plurality of equations that correspond with a plurality of location locus circles and calculate at least one point where at least two circles intersect with each other, wherein an intersection represents a possible location of the emitter, and the processor transmits the graphical representation for the probable location of emitter to the display.

4. The system of claim 3, wherein the location of the emitter is calculated by grouping intersections that lie on a same coordinate and summing each grouping.

5. The system of claim 4, wherein the grouping with the most intersections is the location of the emitter and the processor transmits a graphical representation for the grouping with the most intersections to the display.

6. The system of claim 4, wherein the groupings of the intersections are evaluated by the processor with a moving window to smooth out random measurement error.

7. The system of claim 1, wherein the power level of the radiation signal is measured at at least four measurement points to determine an unambiguous location for the emitter.

8. The system of claim 7, wherein the processor is programmed to calculate a solution for the location of the emitter by calculating a plurality of equations that correspond with a plurality of circles and determining a point where all of the circles intersect with each other.

9. The system of claim 1, wherein the processor is programmed to assume the radiation signal propagates from the emitter to the power measurement sensor through a medium having a substantially constant path loss exponent.

10. The system of claim 1, wherein the power level of the radiation signal is measured at at least three measurement points to estimate the location of the emitter.

11. The system of claim 1, wherein the power level of the radiation signal is measured at at least two measurement points to estimate the location of the emitter.

12. The system of claim 1, wherein the radiation signal is one of the following, a neutron radiation and a gamma radiation.

* * * * *